United States Patent
Ono

(10) Patent No.: US 7,029,243 B2
(45) Date of Patent: Apr. 18, 2006

(54) GAS COMPRESSOR HAVING OIL SEPARATION FILTER

(75) Inventor: Hiromiki Ono, Chiba (JP)

(73) Assignee: Calsonic Compressor Inc., Utsunomiya (JP)

( * ) Notice: Subject to any disclaimer, the term of this patent is extended or adjusted under 35 U.S.C. 154(b) by 67 days.

(21) Appl. No.: 10/730,202

(22) Filed: Dec. 5, 2003

(65) Prior Publication Data

US 2004/0115081 A1 Jun. 17, 2004

Related U.S. Application Data

(62) Division of application No. 10/349,885, filed on Jan. 23, 2003, now Pat. No. 6,851,940.

(30) Foreign Application Priority Data

Jan. 25, 2002 (JP) ............................. 2002-016637
Jan. 16, 2003 (JP) ............................. 2003-007866

(51) Int. Cl.
*F04B 23/00* (2006.01)
*F01C 21/00* (2006.01)

(52) U.S. Cl. .................... 417/313; 418/47; 418/DIG. 1; 55/490

(58) Field of Classification Search ................ 417/313; 418/47, DIG. 1; 55/490
See application file for complete search history.

(56) References Cited

U.S. PATENT DOCUMENTS

| 3,684,412 | A | * | 8/1972 | Harlin et al. | 418/89 |
| 4,137,018 | A | * | 1/1979 | Brucken | 417/440 |
| 4,478,054 | A | * | 10/1984 | Shaw et al. | 62/323.4 |
| 4,490,100 | A | * | 12/1984 | Okazaki | 418/98 |

* cited by examiner

*Primary Examiner*—Charles G. Freay
(74) *Attorney, Agent, or Firm*—Adams & Wilks

(57) ABSTRACT

Disclosed is a gas compressor capable of preventing deformation of a filter used for separating oil contained in a compressed gas. The gas compressor includes a suction port, a suction chamber, a gas compressing portion, a compressed gas releasing portion provided in the gas compressing portion, a discharge chamber, and a discharge port. Provided in the discharge chamber is a filter for separating oil contained in the compressed gas. The filter is configured such that the outer peripheral portion of the filter is expanded peripherally upon its deformation caused when the force (dynamic pressure) of a jet stream formed by the flow of the compressed gas released from the compressed gas releasing portion and the force (static pressure) due to a difference in pressure between front and rear sides of the filter which is generated by the flow path resistance in the filter are applied to the filter whereby the force with which the filter is held in close contact with the filter installation portion is increased.

3 Claims, 12 Drawing Sheets

FIG. 11
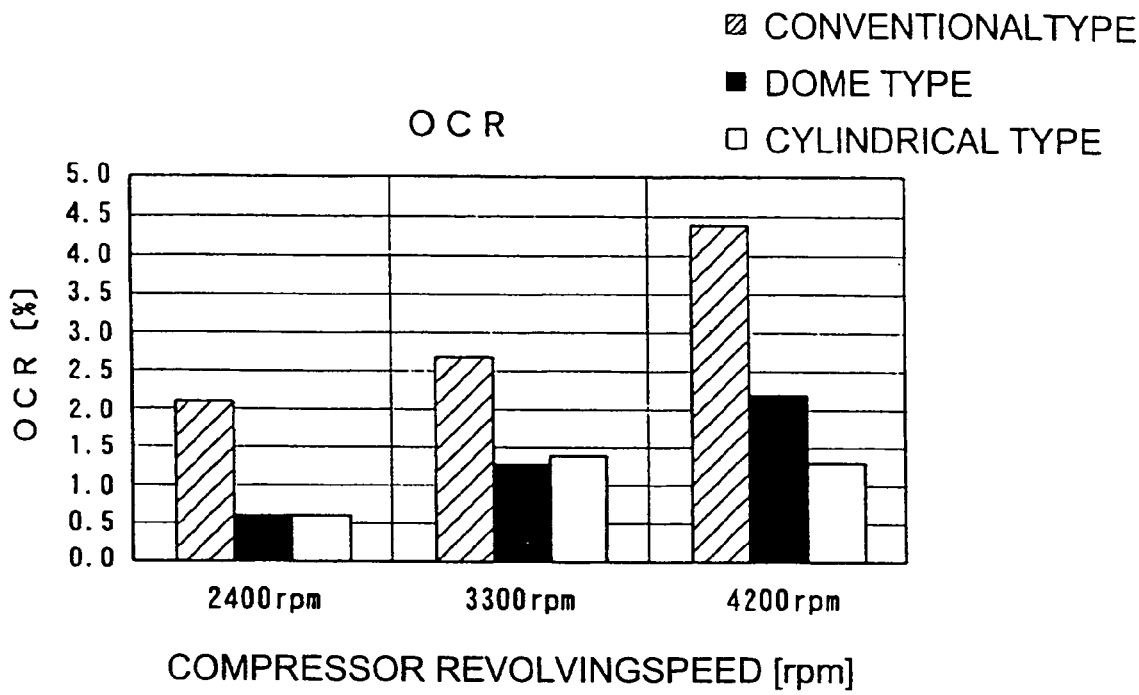
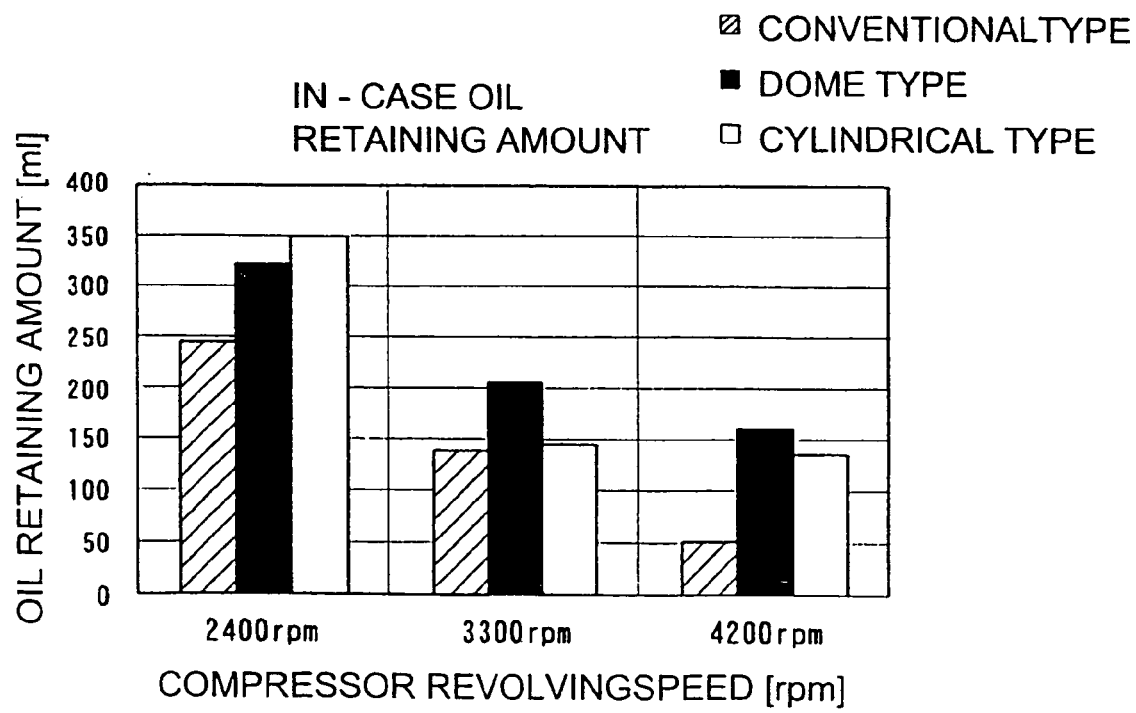
FIG. 12

GAS COMPRESSOR HAVING OIL SEPARATION FILTER

CROSS REFERENCE TO RELATED APPLICATIONS

The present application is a division of U.S. application Ser. No. 10/349,885, filed on Jan. 23, 2003 and now U.S. Pat. No. 6,851,940, and priority thereto for common subject matter is hereby claimed.

BACKGROUND OF THE INVENTION

1. Field of the Invention

The present invention relates to a gas compressor for air conditioning in automobiles, buildings, etc. which is adapted to compress a gas, such as a refrigerant gas, and discharge it.

2. Description of the Related Art

Examples of a gas compressor for air conditioning in automobiles, buildings, etc. include a vane rotary type gas compressor, which will be described with reference to FIG. 13. The vane rotary type gas compressor includes a gas compressing portion, which has a cylinder 5 whose inner periphery is cylindrical, a front side block 6 and a rear side block 7 which are situated at the axial ends of the cylinder 5, a rotor 11 rotatably arranged in the cylinder 5, and vanes 15 accommodated in vane grooves in the rotor 11 so as to be capable of advancing and retreating. The rotor 11, the vanes 15, and the cylinder 5 define cylinder compression chambers. The above components are contained in a front housing 1a and a rear housing 1b. The front housing 1a has a refrigerant suction port 2, and the rear housing 1b has a discharge port 3. Provided in the front housing 1a is a suction chamber 4 communicating with the suction port 2, and the suction chamber 4 communicates with the cylinder compression chambers. Further, a discharge chamber 8 communicating with the cylinder compression chambers is provided in the space defined by the rear side block 7 provided in the front portion of the rear housing 1b and the rear portion of the rear housing 1b.

Formed in the rear side block 7 are discharge holes 7a communicating with the cylinder compression chambers, discharge passages 7b, and a release hole 7c provided to the discharge chamber 8. The gas compressed in the cylinder compression chambers is released to the discharge chamber 8 through the release hole 7c. In the discharge chamber 8, it is necessary to separate oil contained in the compressed gas released from the release hole 7c. In this regard, the gas compressor is provided with a screw type compressor using a demister 30 in order to enhance the efficiency in oil separation. The demister 30 is provided perpendicularly with respect to the direction in which the gas flows, and, while having a certain thickness, is formed as a flat plate when seen in section taken along the gas flow direction.

In the gas compressor shown in FIG. 13, when the rotor 11 is rotated, the volume of the cylinder compression chambers is varied, and a refrigerant introduced through the suction port 2 and the suction chamber 4 is compressed in the cylinder compression chambers. The compressed refrigerant is discharged from the compression chambers, and released to a release-portion-side space 8a of the discharge chamber 8 through the discharge holes 7a, the discharge passages 7b, and the release hole 7c, the oil contained in the compressed gas being separated by the demister 30. The separated oil drips and gathers in an oil sump 18, and the compressed gas from which the oil has been separated is discharged to a discharge-port-side space 8b of the discharge chamber 8, and is further carried from the discharge port 3 to an external air conditioning system through discharge piping (not shown). The refrigerant which has been discharged to the exterior circulates through the air conditioning system and returns to the suction port 2 of the gas compressor to be compressed again in the cylinder compression chambers and further discharged into the air conditioning system. By repeating this operation, air conditioning is continuously effected. Due to the difference in pressure between the suction chamber 4 and the discharge chamber 8, the oil in the oil sump 18 is sent from an oil supply hole 9 provided at the bottom of the rear side block 7 to sliding portions and gap portions of the gas compressing portion, serving to prevent wear in the compressor and functioning as a seal in the form of an oil film. In this process, part of the oil joins the compressed gas and moves with the same. [Patent Document 1 JP 11-294362 A]

As compared with the other types of compressors, e.g., the swash plate type, scroll type, and screw type ones, the vane rotary type compressor is smaller and lighter in weight. However, due to the large difference in pressure between the adjacent compression chambers, it is subject to leakage of the refrigerant gas (inner leakage) between the adjacent compression chambers. Thus, in the vane rotary type compressor, it is necessary to effect sealing by using high viscosity oil in order to prevent this inner leakage. As a result, the mixture gas consisting of the refrigerant gas and oil mist and discharged from the compression chambers exhibits high viscosity. Due to its high viscosity, the mixture gas undergoes, when it strikes the demister, an increase in frictional force when passing therethrough due to the oil adhering to the demister, with the result that the load on the demister due to the jet stream thereto increases. As a result, there may be a case where the demister fails to maintain its form and is pushed away in the gas flow direction (to the downstream side) to undergo a reduction in its density, resulting in a marked deterioration in oil separation efficiency. Further, when the oil exhibits an extremely high viscosity because of its low temperature as in the case of operation start or when a liquid refrigerant is compressed, the oil from the compression chambers strikes the demister in the liquid state. In such case, due to the large force of the jet stream, the demister undergoes not only deformation but breakage. Generally speaking, oil used in a refrigerant compressor exhibits a kinematic viscosity as follows. The viscosity of the mixture of oil and refrigerant during operation varies according to the kind of refrigerant, temperature, pressure, etc. The ratio of the viscosity of the mixture of oil and refrigerant during operation in a vane rotary type compressor to that in other types of compressor is much the same as the ratio of the kinematic viscosity of the oil alone (refrigeration oil) in a vane rotary type compressor to that in other types of compressor as shown in Table 1. The temperature of the mixture gas after compression in normal operation is approximately 70 to 110° C., whereas the temperature thereof at the operation start ranges from −35 to 40° C.

TABLE 1

| Kinematic viscosity of oil | Oil for vane rotary type | Oil for swash plate type, scroll type and screw type |
| --- | --- | --- |
| 40° C. | 60–350 mm$^2$/s | 15–55 mm$^2$/s |
| 100° C. | 13–25 mm$^2$/s | 5–12.5 mm$^2$/s |

SUMMARY OF THE INVENTION

The present invention has been made in view of the above-mentioned problem in the prior art. It is an object of the present invention to provide a gas compressor capable of effectively preventing deformation of the oil separation filter to thereby maintain satisfactory oil separation efficiency.

In order to solve the above-mentioned problem, a gas compressor according to an aspect of the present invention is characterized by including: a suction port for taking in a gas from outside; a suction chamber communicating with the suction port; a gas compressing portion communicating with the suction chamber; a compressed gas releasing portion provided in the gas compressing portion; a discharge chamber communicating with the compressed gas releasing portion; a discharge port communicating with the discharge chamber and adapted to discharge a compressed gas to outside; and a filter dividing a discharge chamber space into the compressed gas a releasing portion side space and a discharge port side space, wherein the filter is installed with its outer peripheral portion being situated in a peripheral installation portion between the compressed gas the releasing portion side space and the discharge port side space and is configured such that the outer peripheral portion of the filter is expanded peripherally upon its deformation caused when a force (dynamic pressure) of a jet stream due to a flow of the compressed gas released from the compressed gas releasing portion and a force (static pressure) due to a difference in pressure between front and rear sides of the filter which is generated by a flow path resistance in the filter are applied thereto, thereby increasing a force with which the filter is held in close contact with the installation portion.

A gas compressor according to another aspect of the present invention is characterized by including: a suction port for taking in a gas from outside; a suction chamber communicating with the suction port; a gas compressing portion communicating with the suction chamber; a compressed gas releasing portion provided in the gas compressing portion; a discharge chamber communicating with the compressed gas releasing portion; a discharge port communicating with the discharge chamber and adapted to discharge the compressed gas to outside; and a filter arranged in the discharge chamber so as to extend in a direction crossing the direction in which the compressed gas is released from the compressed gas releasing portion and dividing a discharge chamber space into the compressed gas a releasing portion side space and a discharge port side space, wherein both front and back sides of the filter are convex on the compressed gas inflow side.

Further, a gas compressor according to the present invention is characterized by including: a suction port for taking in a gas from outside; a suction chamber communicating with the suction port; a gas compressing portion communicating with the suction chamber; a compressed gas releasing portion provided in the gas compressing portion; a discharge chamber communicating with the compressed gas releasing portion; a discharge port communicating with the discharge chamber and adapted to discharge a compressed gas to outside; a cylindrical body extending in the discharge chamber so as to surround the compressed gas releasing portion to define an inner space in the discharge chamber; and a filter arranged so as to cover an opening of the cylindrical body.

Further, a gas compressor according to the present invention is characterized in that both the front and back sides of the filter are convex on the compressed gas inflow side.

Further, a gas compressor according to the present invention is characterized in that an apex of the convex portion of the filter is situated at a position where the compressed gas released from the compressed gas releasing portion strikes.

Further, a gas compressor according to the present invention is characterized by further including: an oil sump provided in a lower portion of the discharge chamber, and an oil intake port for supplying oil accumulated in the oil sump to the interior of the gas compressing portion, in which the oil intake port is situated outside the cylindrical body.

Further, a gas compressor according to the present invention is characterized in that the cylindrical body has a tapered configuration gradually diminishing in sectional area from the compressed gas releasing portion toward the side where the filter is arranged.

Further, a gas compressor according to the present invention is characterized in that the gas compressing portion is equipped with a cylinder, side blocks situated at axial ends of the cylinder, a rotor rotatably arranged in the cylinder, and vanes provided in the rotor so as to be radially retractable, and that the oil used in the gas compressing portion exhibits a kinematic viscosity in a range of 60 to 350 $mm^2/s$ at 40° C. and 13 to 25 $mm^2/s$ at 100° C.

Thus, in accordance with the present invention, the filter is configured such that the outer peripheral portion of the filter is expanded peripherally upon its deformation caused when a force (dynamic pressure) of a jet stream due to a flow of the compressed gas released from the compressed gas releasing portion and a force (static pressure) due to a difference in pressure between front and rear sides of the filter. As a result of the above deformation, the outer peripheral portion of the filter expands to generate a force with which the outer peripheral portion is pressed against the installation portion, and the force with which the outer peripheral portion is held in close contact with the installation portion increases, whereby the retaining capacity for the filter itself is enhanced.

Further, when the filter configuration is such that both the front and back sides of the filter are convex on the upstream side with respect to the direction of the compressed gas flow, besides the actions described above, the filter is not easily deformed by the force of the jet stream of the compressed gas; if deformed, it is only changed from the convex to a flat configuration to thereby absorb the load, thereby preventing breakage of the filter and a deterioration in the oil separation efficiency.

It is important that the filter should be convex on the upstream side with respect to the direction of the flow; apart from a dome-like (semispherical) one and a conical one, its configuration may also be a polygon one, such as a triangular pyramid and a quadrangular pyramid. Further, the number of convex shapes is not restricted to one; a combination of a plurality of convex shapes will also serve the purpose. Further, apart from the configuration in which the entire filter is convex, a configuration in which a part of the filter is convex is also acceptable. Further, in the case where the convex shape is to be formed as a curved surface, the curved surface may be a parabolic surface or a hyperbolic surface other than a spherical surface.

The degree of convexity may be appropriately determined. In the case of a disc-like filter, it is desirable that the ratio of the height of the convex portion to the filter diameter be 0.05 to 0.20.

Further, it is desirable that the apex of the convex portion be situated at a position where the compressed gas strikes. By thus determining the apex position, the effect of absorbing the load applied to the filter can be further enhanced. Further, when providing the compressed gas releasing portion, it is desirable that the releasing direction of the compressed gas be determined such that the compressed gas strikes the apex of the convex portion. For example, in the case of a compressor having two compression chambers and two releasing portions, it is desirable that these releasing portions be configured such that the compressed gas released therefrom is directed to the apex of the convex portion. In the releasing portion, the compressed gas may be directly released toward the apex of the convex portion, or it may first strike a baffle plate before heading for the apex.

Further, in accordance with the present invention, the filter is arranged so as to clog the hole of the cylindrical body forming the inner space in the discharge chamber, so that the filter area is small, making it possible to diminish the amount of deformation due to the load of the compressed gas.

However, from the viewpoint of the oil separation efficiency of the filter, it is to be assumed that there exists an optimum value for the filter area (diameter), so that it is desirable to make the diameter of the filter small while taking into account the separation efficiency. A means for making the filter diameter smaller than the inner diameter of the discharge space will be to form an inner space in the discharge space by means of a cylindrical body and to make one end of the cylindrical body open on the compressed gas releasing portion, installing the filter at the other end. In this case, the filter configuration may be flat. However, when a still higher level of strength is desired, the above-described configuration which is convex on the side where the compressed gas flows in is adopted. In installing the filter, a hole with the requisite opening area is formed in the end surface portion on the filter installation side of the cylindrical body, and the filter is inserted from the releasing portion side, or when it is to be inserted from the filter installation side end surface portion, a ring-shaped presser, for example, is fixed by screws or by a snap ring.

Due to the provision of the cylindrical body, the durability of the filter is improved, and communication is established between the oil sump and the oil intake port leading to the compression chambers, so that in the case in which the discharge space is divided into two, a difference in pressure is generated between the resultant two spaces, with the result that the oil level on the releasing portion side is lowered, whereby there is no fear of shortage in oil supply to the oil intake port. The oil intake port is provided outside the cylindrical body, whereby oil is smoothly supplied from the oil sump.

The cylindrical body may be tapered so as to be diminished in its sectional area from the releasing portion side toward the filter side. By adopting such a tapered configuration, it is possible to deflect the compressed gas striking the inner surface of the cylindrical body toward the center of the filter. Further, by forming the cylindrical body in such a tapered configuration, it is possible to prevent or restrain intrusion of oil from the oil sump to the interior of the cylindrical body. Further, also in the case in which oil gathers in the cylindrical body, it is possible to prevent as much as possible a reduction in the filter opening area. When the filter opening area is reduced, the flow velocity of the refrigerant gas passing through the filter increases, which leads to a deterioration in the oil catching performance and the oil separation performance.

Further, in accordance with the present invention, in releasing the compressed gas from the compressed gas releasing portion toward the discharge chamber, the passage area of the mixture gas from the compression chambers is enlarged up to the opening area of the filter immediately after passing the outlet of the releasing portion, so that the flow velocity at the filter inlet is reduced in inverse proportion to the enlargement ratio of the area, which leads to a state in which oil mist is easily separated. This compressed gas strikes the filter, whereby the oil contained in the compressed gas is separated effectively.

That is, the oil drips without passing through the filter, whereas the compressed gas from which the oil has been separated passes through the filter, and is then discharged to the exterior from the discharge port. In particular, when the filter is formed by weaving thin wires in a random and complicated manner, the oil mist, whose density is larger than that of the refrigerant gas, moves straight ahead and strikes wires without fail to become oil droplets. In contrast, the refrigerant gas passes freely through the space of a complicated configuration, thus passing through the filter. The oil turned into oil droplets reaches the oil sump by gravity. Since the flow velocity of the refrigerant gas at the filter outlet has been reduced, oil droplets are not easily stirred up.

If the compressed gas discharged from the discharge port more or less contains oil even after the separation, the amount of oil thus remaining is obviously smaller as compared with that in the conventional gas compressor, restraining as much as possible a deterioration in the efficiency of the air conditioning system and a reduction in the oil amount in the gas compressor.

Further, due to the installation of the filter, there is no need to provide an oil separation block as used in the prior art, thereby making it possible to achieve a reduction in the weight of the gas compressor and a reduction in component cost.

In the present invention, it is possible to adopt filters formed of various materials. Preferably, a filter is adopted in which short-fiber or long-fiber wires are arranged at random in the planar direction and the thickness direction. The fibers may be an SUS (stainless steel) material, and their thickness is, for example, 0.15 to 0.30 mm. When a compressed gas containing oil mist passes through such a filter, exclusively the oil, which consists of larger particles, strikes wires and drips, whereas the compressed gas, which consists of smaller particles, changes direction freely and passes between the wires. In this way, a superior oil separation performance is obtained. When the filter possesses an appropriate density and porosity, the oil separation performance is further enhanced. Preferably, the density ranges from 1.0 to 3.0 g/cm$^3$, and the porosity ranges from 60 to 95%. The optimum size of the filter varies depending upon the volume of the discharge chamber, etc. For example, in the case of a disc-shaped filter, it may have a diameter of 40 to 150 mm and a thickness of 8 to 30 mm.

It is desirable that the filter of the present invention be formed in a fixed thickness (axial length). By thus forming the filter, the density distribution of the mixture gas consisting of refrigerant gas and oil is uniformalized when it passes through the filter, thereby maintaining a high separability for the refrigerant gas and oil. That is, when the filter has a locally thick portion, the speed at which the mixture gas passes through that portion decreases, and the density of the mixture gas in that portion increases, so that there is a fear of clogging, which will eventually lead to a phenomenon similar to that when the opening area of the filter itself is reduced.

Since the force (dynamic pressure) of the jet stream due to the compressed gas flow and the force (static pressure) due to the difference in pressure before and after the filtering generated by the flow path resistance are applied to the filter, the filter is likely to be shifted or detached from the installation position. To cope with this problem, it is desirable to provide, at least on the filter back side, a retaining portion for preventing the filter from moving to the downstream side of the compressor. Such the retaining portion can be provided so as to extend over a part or all of the peripheral edge of the filter.

It is only necessary for the filter to be arranged in the discharge chamber so as to divide the space from the compressed gas releasing portion to the discharge port into a compressed gas releasing portion side space and a discharge port side space. In installing the filter, it is desirable to secure a sufficient volume for the releasing portion side space so that the flow velocity of the compressed gas released from the compressed gas releasing portion may be sufficiently low.

The gas compressor of the present invention includes the above-mentioned suction port, suction chamber, compression chambers, discharge chamber, and discharge port. While these components are indispensable for the present invention, there are no particular limitations regarding their specific constructions, configurations, etc., and the present invention is applicable to various constructions with the above components. A typical example is a vane rotary type compressor. As described above, the vane rotary type compressor involves a high kinematic viscosity of oil and a large load on the filter, so that it makes it possible to more effectively solve the problem due to the load applied to the filter by the compressed gas.

BRIEF DESCRIPTION OF THE DRAWINGS

In the accompanying drawings:

FIG. 11 is a graph showing OCR (oil circulation ratio) in an example of the present invention;

FIG. 12 is a graph showing oil retaining amount in the example of the present invention.

DESCRIPTION OF THE PREFERRED EMBODIMENTS

Embodiment 1

Figure 1:
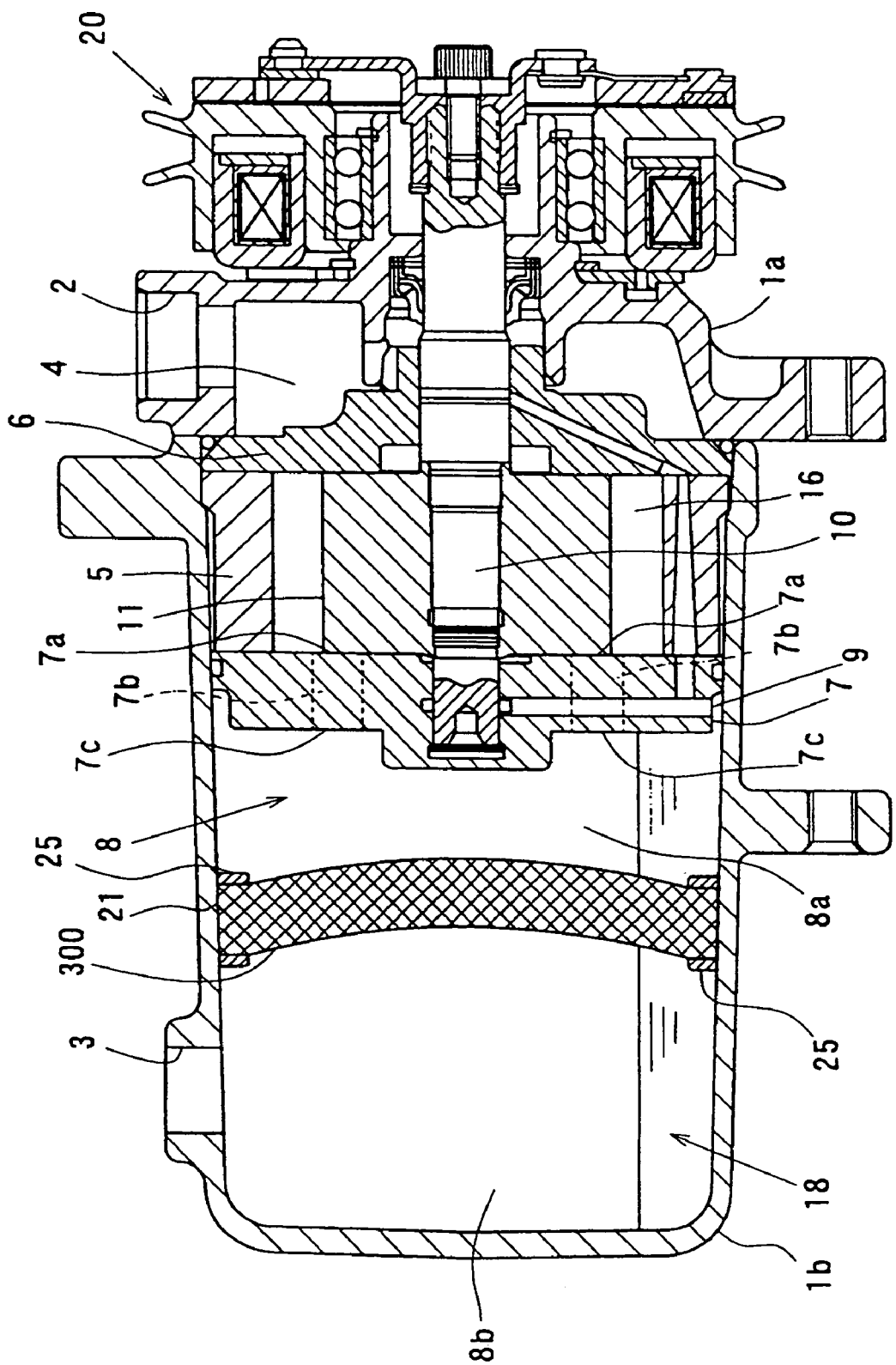
FIG. 1 is a general front sectional view of a gas compressor according to a first embodiment of the present invention.

A gas compressor according to a first embodiment of the present invention will now be described with reference to FIGS. 1 and 2, in which the components which are the same as those of the conventional example are indicated by the same reference numerals.

FIG. 1 shows the general construction of a gas compressor. The gas compressor is equipped with a front housing 1a having a suction port 2 and a rear housing 1b having a discharge port 3. Connected to the suction port 2 is suction piping (not shown) for sucking in the refrigerant gas to be compressed from the outside, and connected to the discharge port 3 is discharge piping (not shown) for supplying the compressed refrigerant to a condenser or the like (not shown).

In the front housing 1a, there is formed a suction chamber 4, which communicates with the suction port 2. Further, arranged in the rear housing 1b is a cylinder 5 having an inner peripheral surface which is substantially elliptical in a section perpendicular to the axial direction, and there are arranged a front side block 6 (the suction port 2 side) and a rear side block 7 (the discharge port 3 side), which are firmly attached to the axial end surfaces of the cylinder 5 so as to be parallel to each other. As indicated by imaginary lines in FIG. 2, the front side block 6 has two suction passages 6a so as to establish communication between the suction chamber 4 and the interior of the cylinder 5.

Figure 2:
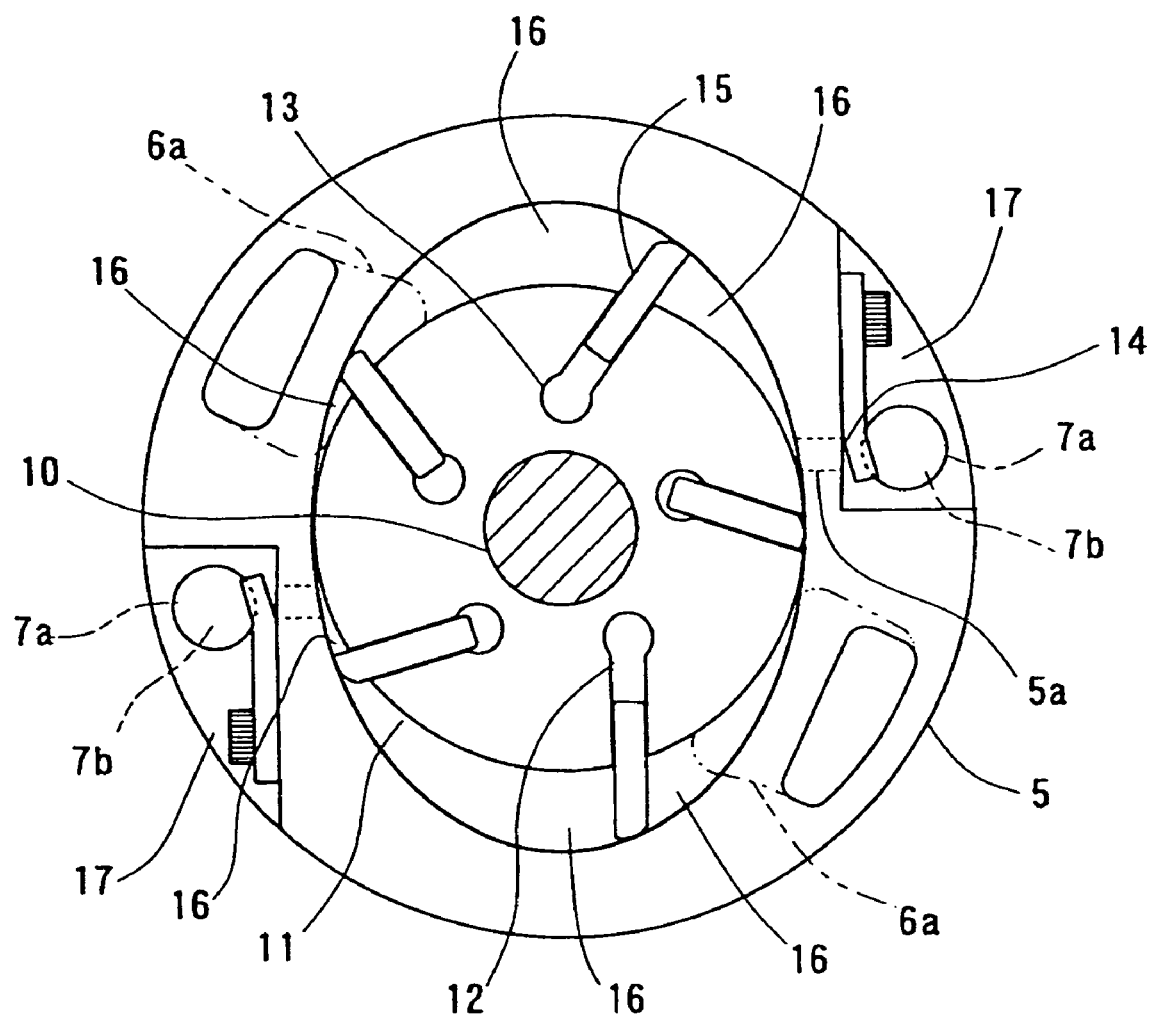
FIG. 2 is a side end view showing the interior of the cylinder of the gas compressor of FIG. 1.

As shown in FIG. 2, a rotatable rotor 11 supported by a rotor shaft 10 is arranged inside the cylinder 5. On the front side of the gas compressor, the rotor shaft 10 is connected to an electromagnetic clutch 20, and drive force of an internal combustion engine (not shown) is transmitted by the operation of the electromagnetic clutch 20.

In the rotor 11, a plurality of (five in the example shown) vanes 15 slidably fitted into a plurality of vane grooves 12 are radially retained. When the rotor 11 is rotated, the vanes 15 are caused to advance and retreat by the centrifugal force and the pressure of oil supplied from back pressure chambers 13, rotating while in close contact with the inner peripheral wall of the cylinder 5. The cylinder 5, the rotor 11, the vanes 15, the front side block 6, and the rear side block 7 constitute main components of a gas compressing portion, and the inner peripheral surface of the cylinder 5, the vanes 15, the outer peripheral surface of the rotor 11, the rear end surface of the front side block 6, and the front end surface of the rear side block 7 form cylinder compression chambers 16.

Two cylinder discharge holes 5a connecting the inner and outer sides are formed in the inner periphery of the cylinder 5 along the inner and outer directions, and communicated at one end with the compression chambers 16. The other ends of the cylinder discharge holes 5a can be opened and closed by reed valves 14. At the other ends of the cylinder discharge holes 5a, there are provided cylinder discharge spaces 17. Further, the rear side block 7 has two discharge passages 7b extending in the thickness direction, and discharge holes 7a of the discharge passages 7b open into the cylinder discharge spaces 17.

Further, in the space formed by the rear side block 7 and the rear housing 1b, there is provided a discharge chamber 8 communicating with the cylinder compression chambers 16. And, at the rear end of the rear side block 7, two discharge holes 7c connected to the discharge passages 7b are formed as compressed gas releasing portions.

In the lower portion of the discharge chamber 8, there is provided an oil sump 18 in the shown longitudinal direction. The oil in the oil sump 18 is sent out by a difference in pressure in the gas compressor, generating dynamic pressure in the bearing portion of rotor shaft 10, preventing wear in the compressor, and providing a seal in the form of an oil film.

In the gas compressor of this embodiment, a filter 300 is vertically arranged substantially at the longitudinal center of the discharge chamber 8. In order that it may divide the discharge chamber 8 into a releasing-portion-side space 8a and a discharge-port-side space 8b, the filter 300 is formed as a disc whose configuration and size are such that its contour follows the inner peripheral wall of the rear housing 1b. The filter 300 is installed by bringing its outer peripheral portion into close contact with an installation portion 21 provided on the inner peripheral surface of the rear housing 1b between the releasing-portion-side space 8a and the discharge-port-side space 8b. The installation portion 21 is provided with retaining portions 25, 25 spaced apart from each other according to the thickness of the filter 300, and the filter 300 is fixed in position between the retaining portions 25, 25. The filter 300 is formed by arranging wires consisting of long metal fibers at random in the planar direction and the thickness direction, and both the front and back sides thereof are convex in a dome-like (semispherical) fashion on the compressed-gas flow-in side, that is, on the releasing holes 7b side. In this embodiment, the filter 300 is formed as a disc by using SUS long fibers having a thickness of 0.15 to 0.30 mm in a density of 1.0 to 3.0 g/cm$^3$ and in a porosity of 60 to 95%. Further, in this embodiment, the filter has a diameter of 40 to 150 mm and a thickness of 8 to 30 mm, and the ratio of the height of the convex portion to the filter diameter is 0.05 to 0.20, the apex of the convex portion being situated at the center of the filter 300.

Next, the operation of the above-described gas compressor will be described.

When operating the gas compressor, the electromagnetic clutch 20 is operated, and the rotor shaft 10 is rotated by the internal combustion engine (not shown). Then, the rotor 11 rotates with the rotation of the rotor shaft 10. By the centrifugal force due to this rotation and oil supply to the back pressure chambers 13, a pressurizing force toward the outer periphery is applied to the vanes 15. As shown in FIG. 2, the vanes 15 under the pressurizing force move toward the outer periphery, rotating with the rotor 11 while in close contact with the inner peripheral wall of the cylinder 5 and the side walls of the front side block 6 and the rear side block 7. As a result of this rotation, a sucking force is generated in the cylinder 5, sucking refrigerant gas through the suction port 2 from the suction piping. The refrigerant gas is sucked into the suction chamber 4, and sucked into the cylinder 5 through the two suction passages 6a provided in the front side block 6. In the cylinder 5, the refrigerant gas is successively compressed through a variation in the volume of the cylinder compression chambers 16.

The compressed refrigerant gas is sent from the cylinder compression chambers 16 to the cylinder discharge holes 5a, and the reed valves 14 are opened. Then, the gas is further conveyed by way of the discharge spaces 17, the rear side block discharge holes 7a, the discharge passages 7b, and the releasing holes 7c to be released into the releasing-portion-side space 8a of the discharge chamber 8. As it undergoes the suction, compression, and releasing processes, the refrigerant gas takes up oil in the gas compressor, and is discharged from the releasing holes 7b into the space 8a of the discharge chamber 8 in a state in which it contains oil.

In the gas compressor of this embodiment, a perfectly circular rotor 11 is arranged at the center of a cylinder 5 with an elliptical inner configuration, and two crescent-shaped cylinder chambers are formed as diagonally opposed positions, so that the refrigerant gas can undergo a series of operations: suction, compression, and discharge, in both cylinder chambers. Further, as shown in FIG. 2, the suction passages 6a, the cylinder discharge holes 5a, the reed valves 14, the discharge spaces 17, the rear side block discharge holes 7a, the discharge passages 7b, etc. are provided in twos.

Further, in the gas compressor of this embodiment, five vanes 15 are arranged in the rotor 11, so that while the rotor 11 makes one rotation, the formation of a compression chamber 16 defined by vanes is effected five times in one crescent-shaped cylinder chamber. Thus, during one rotation of the rotor 11, the series of operations: the suction, compression, and discharge of refrigerant gas, is effected five times in one crescent-shaped cylinder chamber, which means the series of operations is effected ten times in total in both cylinder chambers. And, since the number of vanes, 5, is an odd number, the operations of suction, compression, and discharge in the two cylinder chambers are reversed in phase and effected alternately.

The compressed gas alternately released from the two releasing holes 7c moves backwards inside the release-portion-side space 8a while being dissipated therein before it strikes the filter 300. As a result of the dissipation, the flow velocity of the compressed gas is considerably reduced as compared with that at the time of releasing. When the compressed gas strikes the filter 300, oil particles contained therein strike the wires of the filter 300, whereas the gas component passes between the wires of the filter 300, whereby the gas and the oil are separated from each other.

The separated oil drips from the filter 300 to gather in the oil sump 18, whereas the gas component passes through the filter 300 to move into the discharge-port-side space 8b to be discharged from the discharge port 3. The oil component of this compressed gas has been removed to a sufficient degree by the filter 300, so that the amount of oil contained in the compressed gas is considerably low as compared with that in the conventional gas compressor. Further, since the amount of oil taken out of the gas compressor is smaller, the reduction in the oil amount in the compressor is small, thus making it possible to secure a sufficient oil retaining amount for a long period of time.

In the gas compressor of the above-described embodiment, the filter 300 is likely to be detached from the retaining portions 25, 25 of the above-described installation portion 21 due to the force of the jet stream formed by the flow of the compressed gas and the difference in pressure between the front and rear portions generated by the flow path resistance. However, due to its convex configuration, the filter 300 of this embodiment has an increased strength, so that although a force to cause a rearward deformation due to the jet stream of the compressed gas is applied thereto when the compressed gas is released from the releasing holes 7b, the filter is not easily deformed backwards, thus preventing a deterioration in the oil separation capacity due to such deformation. Further, if the filter 300 does undergo deformation, the central apex thereof greatly protruding toward the releasing holes 7c side moves to the rearmost position, and the nearer the peripheral edge, the less the deformation, with the result that the filter as a whole becomes flat. As a result, a force directed to the outer periphery is applied to the outer peripheral portion of the filter, and the force with which the filter is held in intimate contact with the installation portion 21 increases, thereby enhancing the retaining capacity of the filter 300 itself.

Embodiment 2

Figure 3:
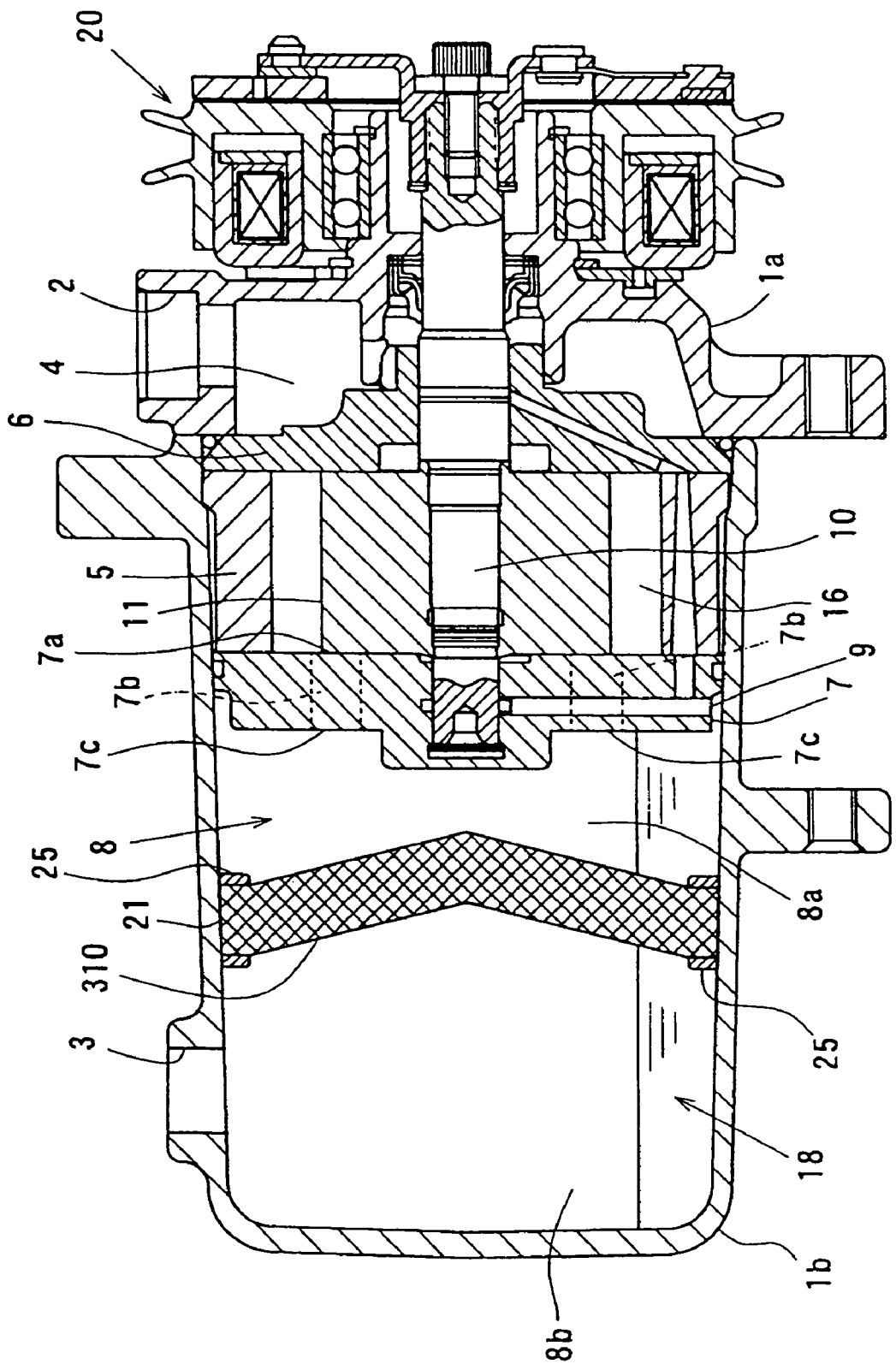
FIG. 3 is a general front sectional view of a gas compressor according to a second embodiment of the present invention with a modified filter configuration.

While in the gas compressor of the first embodiment the filter has a dome-like configuration, the improved filter configuration in the present invention is not restricted thereto. For example, as shown in FIG. 3, according to a second embodiment, it is also possible to adopt a conical filter 310 which is convex on the gas inflow side. As in the filter 300 of Embodiment 1, in the filter of this configuration also, it is possible to achieve the effect of enhancing the retaining capacity for the filter 310. Otherwise, the construction of this gas compressor is the same as that of Embodiment 1, so that the same components are indicated by the same reference numerals and a description of such components will be omitted.

In the above embodiments, the discharge passages 7*b* extending in the axial direction of the compressor are formed in the rear side block 7, and the releasing holes 7*c* are formed at the forward end of the discharge passages 7*b*. As a result, the compressed gas is released from the releasing holes 7*c* substantially along the axial direction, and strikes the filter 300, 310. Thus, in FIGS. 1 and 3, the compressed gas strikes the filter 300, 310 at a position somewhat above the center thereof. In the filter 300, 310, the apex of the convex portion is substantially at the center of the filter surface, and the compressed gas strikes the filter at a position deviated from this apex. It is to be noted that a convex structure exhibits a high level of strength against deformation when the load is applied to the apex thereof. From this point of view, in the above embodiments, the convex configuration of the filter is not utilized to a sufficient degree.

Embodiment 3

Figure 4:
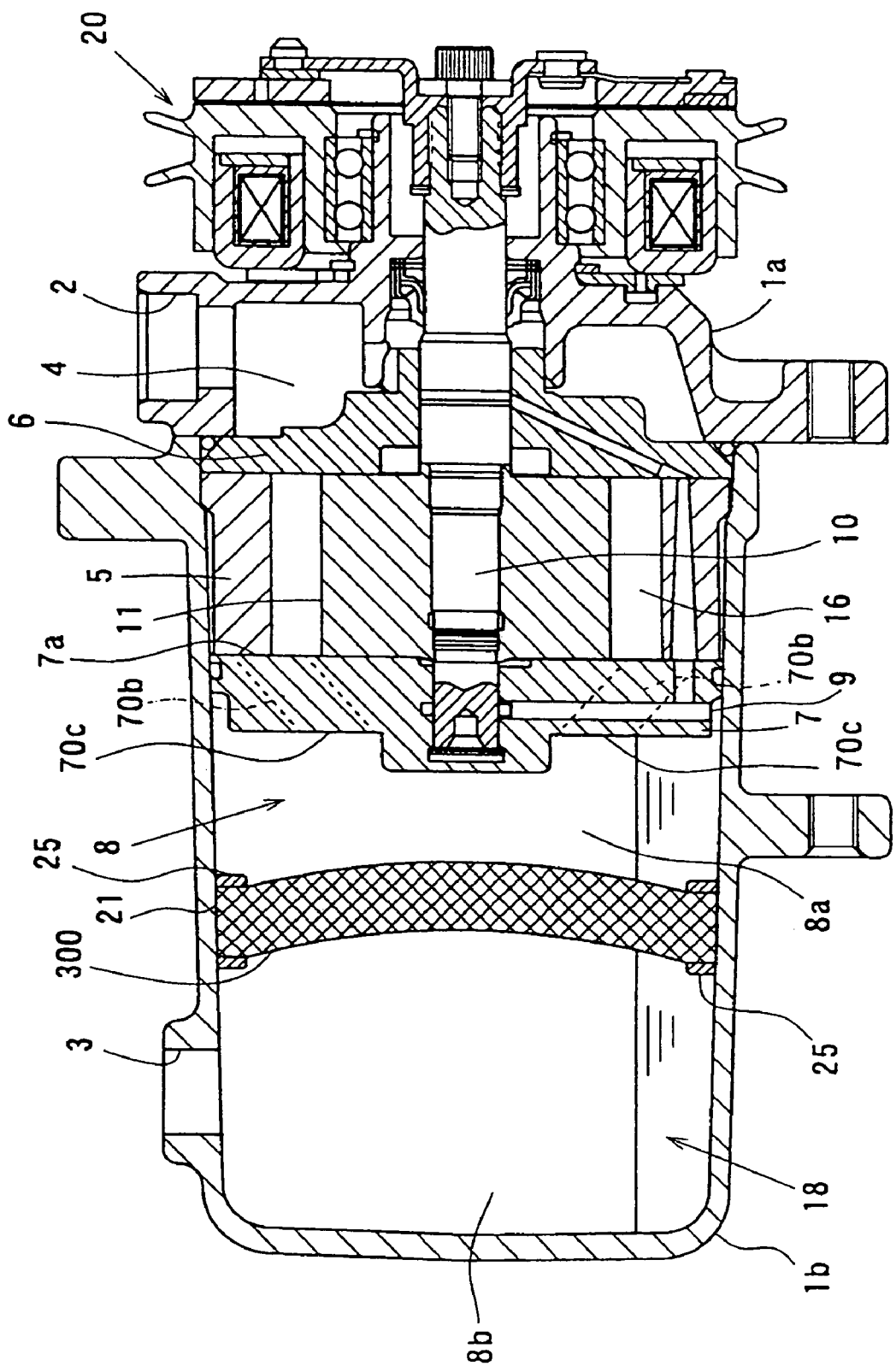
FIG. 4 is a general front sectional view of a gas compressor according to a third embodiment of the present invention with a modified filter configuration.

FIG. 4 shows a gas compressor according to a third embodiment of the present invention.

From the above viewpoint, in this gas compressor, while the configuration of the filter 300 is left unchanged, the rear side block 7 has two discharge passages 70*b* extending obliquely with respect to the axial direction of the compressor, and releasing holes 70*c* serving as the compressed gas releasing portions are formed at the openings at the forward ends thereof. Otherwise, this embodiment has the same construction as that of Embodiment 1. Thus, the same components are indicated by the same reference numerals, and a description of such components will be omitted.

The extending directions of the discharge passages 70*b* are determined such that the compressed gas from the releasing holes 70*c* at the forward ends thereof substantially heads for the center, that is, the apex portion, of the filter 300. In this embodiment, the compressed gas released from the releasing holes 70*c* strikes the apex of the filter 300 and its periphery, so that the filter 300 is effectively prevented from being deformed due to its convex configuration. Further, since the compressed gas strikes the central portion of the filter 300, the load is uniformly transmitted to the filter 300, and the stress applied to the outer peripheral portion of the filter 300 is uniformalized, thereby effectively enhancing the retaining capacity.

Embodiment 4

Figure 5:
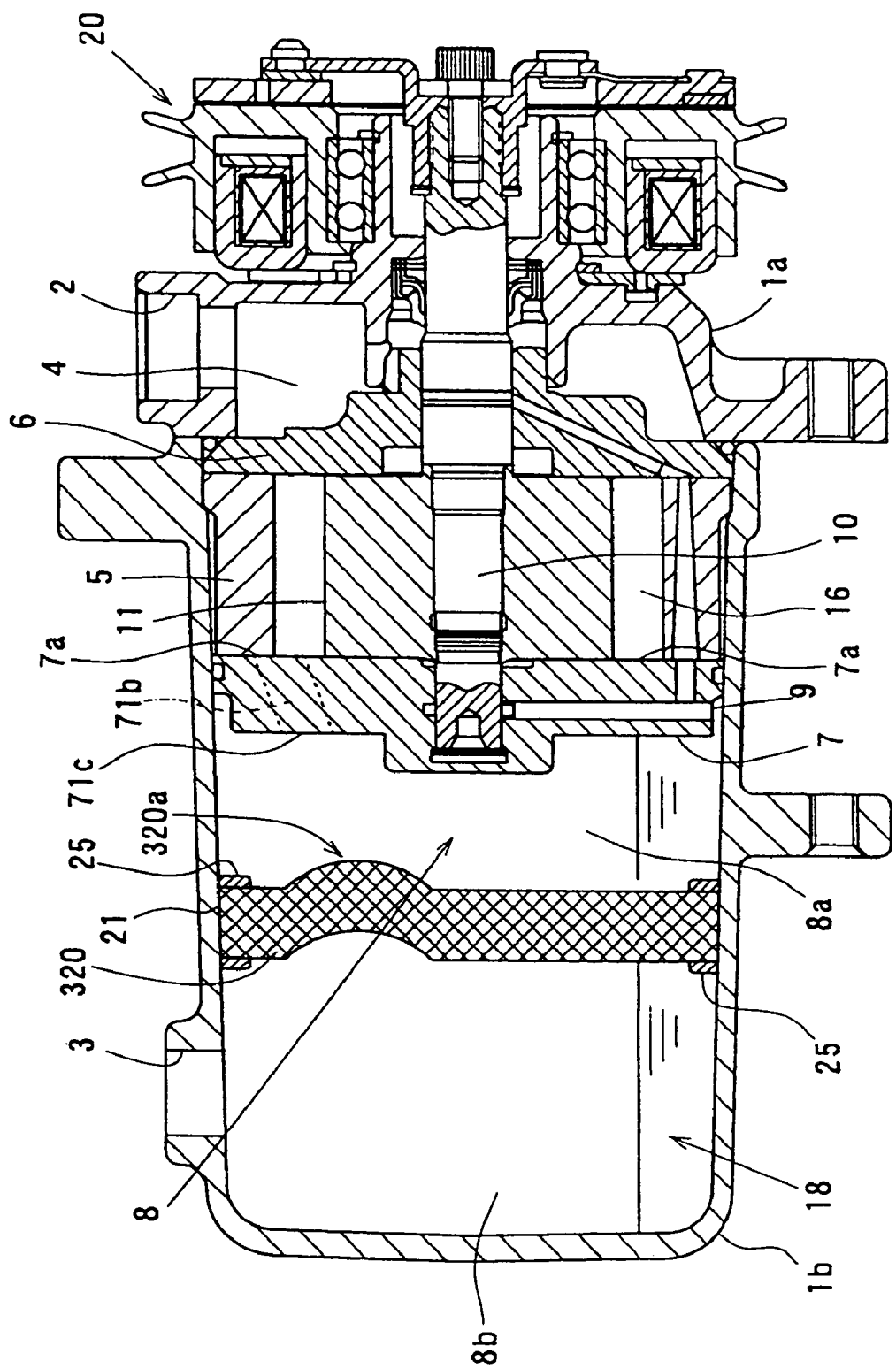
FIG. 5 is a general front sectional view of a gas compressor according to a fourth embodiment of the present invention with a modified filter configuration.

FIG. 5 shows a gas compressor according to a fourth embodiment of the present invention, in which the filter configuration is improved from the above viewpoint.

That is, in the rear side block 7, there is formed a discharge passage 71*b* extending in a direction somewhat inclined with respect to the axial direction of the compressor. The discharge passage 71*b* communicates with one discharge hole 7*a*, and, at the same time, communicates with the other discharge hole 7*a* through a communication passage (not shown). At the forward end of the discharge passage 71*b*, there is formed a releasing hole 71*c* serving as the compressed gas releasing portion. It is also possible for the two discharge passages thus communicating with the gas compressing portion to join into one inside the rear side block.

The discharge passage 71*b* extends such that the compressed gas from the releasing hole 71*c* heads for a position of a filter 320 somewhat above the center thereof. At this position of the filter 320, the apex of a partially formed convex portion 320*a* is situated. Otherwise, the construction of this embodiment is the same as that of Embodiment 1. Thus, the same components are indicated by the same reference numerals, and a description of such components will be omitted.

In this gas compressor of the fourth embodiment also, the compressed gas released from the releasing hole 71*c* strikes the apex of the convex portion 320*a* of the filter 320 and its periphery, so that the filter 320 is effectively prevented from being deformed due to its convex configuration. That is, by modifying the filter configuration such that the apex of the convex portion is situated at the position where the compressed gas strikes, it is possible to enhance the strength increasing effect of the convex configuration.

The filter of the present invention may be entirely formed into convex on both the front and rear sides as in the first through third embodiments, or it may be partially formed into convex as in the fourth embodiment. In the case of the partially convex configuration, it is desirable that the compressed gas released from the releasing hole strike the convex portion, and it is more desirable that the compressed gas strikes the apex of the convex portion.

Embodiment 5

Figure 6:
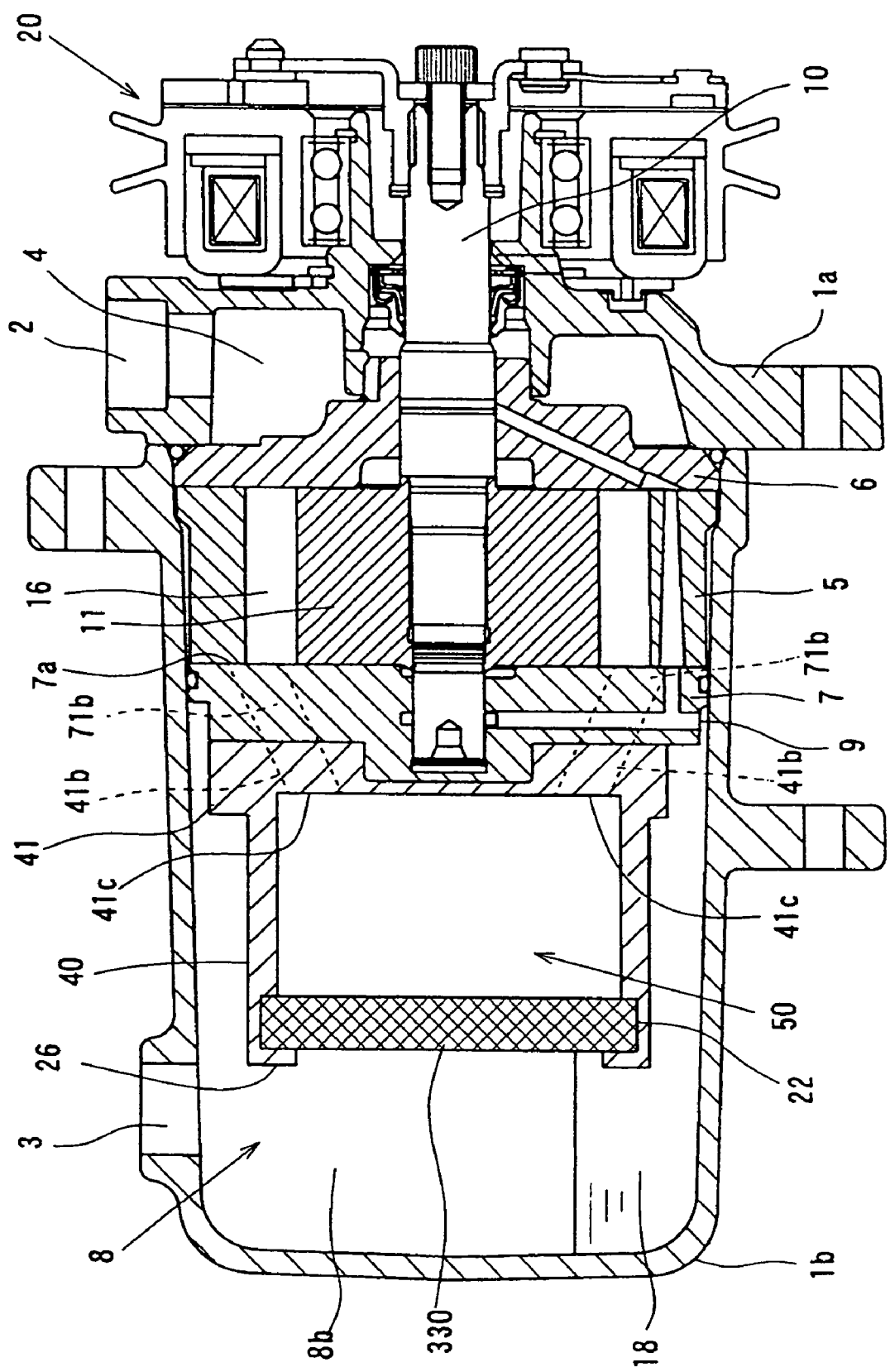
FIG. 6 is a general front sectional view of a gas compressor according to a fifth embodiment of the present invention in which there is arranged a cylindrical body with a filter installed therein.

FIG. 6 shows a gas compressor according to a fifth embodiment of the present invention.

The gas compressor of the fifth embodiment is equipped with a front housing 1*a* having a suction port 2 and a rear housing 1*b* having a discharge port 3. Inside the front housing 1*a*, there is formed a suction chamber 4 communicating with the suction port 2, and, inside the rear housing 1*b*, there is arranged a cylinder 5 having an inner peripheral surface substantially elliptical in a section perpendicular to the axial direction. A front side block 6 (the suction port 2 side) and a rear side block 7 (the discharge port 3 side) are firmly attached to the axial end surfaces of the cylinder 5 so as to be parallel to each other.

As indicated by the imaginary lines in FIG. 2, two suction passages 6*a* are formed in the front side block 6 so as to establish communication between the suction chamber 4 and the interior of the cylinder 5.

As shown in FIG. 2, inside the cylinder 5, there is arranged a rotatable rotor 11 supported by a rotor shaft 10. The drive force of an internal combustion engine (not shown) is transmitted to the rotor shaft 10 through operation of an electromagnetic clutch 20.

The rotor 11 radially retains a plurality of (five in the example shown) vanes 15 slidably fitted into a plurality of vane grooves 12. When the rotor 11 is rotated, the vanes 15 are caused to advance and retreat inside the vane grooves 12 by the centrifugal force and the pressure of oil supplied from back pressure chambers 13, rotating while in close contact with the inner peripheral wall of the cylinder 5. The cylinder 5, the rotor 11, the vanes 15, the front side block 6, and the rear side block 7 constitute the main components of the gas compressing portion, and the inner peripheral surface of the cylinder 5, the vanes 15, the outer peripheral surface of the rotor 11, the rear end surface of the front side block 6, and the front end surface of the rear side block 7 define cylinder compression chambers 16.

In the inner periphery of the cylinder 5, there are formed two cylinder discharge holes 5a communicating at one end with the compression chambers 16 along the inner and outer directions, and the other ends of the cylinder discharge holes 5a can be opened and closed by reed valves 14. At the other ends of the cylinder discharge holes 5a, there are provided cylinder discharge spaces 17. Further, the rear side block 7 has two discharge passages 71b extending in the thickness direction, and the discharge holes 7a of the discharge passages 71b respectively open into the cylinder discharge spaces 17.

Further, a discharge chamber 8 communicating with the cylinder compression chambers 16 is provided in the space defined by the rear side block 7 and the rear housing 1b. Further, a cylindrical body 40 is mounted to the rear side block 7 so as to extend in the discharge chamber 8, and, due to this cylindrical body 40, an inner space 50 is formed in the discharge chamber 8. That is, the inner space 50 constitutes the releasing-portion-side space. The cylindrical body 40 is fixed to the rear side block through the intermediation of a base portion 41, which has second discharge passages 41b communicating with the discharge passages 71b. The forward ends of the discharge passages 41b on the discharge chamber 8 side are formed as releasing holes 41c constituting the compressed gas releasing portions of the present invention. The releasing holes 41c are situated inside the cylindrical body 40 and surrounded by the cylindrical body 40.

At the forward end of the cylindrical body 40, a filter 330 is mounted to a groove-like installation portion 22 formed along the inner peripheral surface of the cylindrical body 40 so as to cover the opening thereof. Further, an annular retaining portion 26 is provided on the discharge port side of the installation portion 22, that is, on the forward end side of the cylindrical body 40. The filter 330 is formed by arranging wires consisting of metal fibers at random in the planar direction and the thickness direction. In this embodiment, the filter 330 is formed as a disc by using long SUS fibers having a thickness of 0.15 to 0.30 mm, in a density of 1.0 to 3.0 g/cm$^3$ and in a porosity of 60 to 95%, and has a diameter of 40 to 150 mm and a thickness of 8 to 30 mm.

The exterior of the filter 330 constitutes the discharge-port-side space 8b.

In the lower portion of the discharge chamber 8, there is provided an oil sump 18. The rear side block 7 has an oil supply hole 9 opening into the oil sump 18. The oil supply hole 9 is situated outside the cylindrical body 40. The oil in the oil sump 18 is sent out through the oil supply hole 9 by a difference in pressure inside the gas compressor, preventing wear in the compressor and providing a seal in the form of an oil film.

Next, the operation of the gas compressor of the fifth embodiment will be described. A description of the operations which are the same as those of the first through fourth embodiments will be omitted or abridged.

A gas which has been compressed through operation of the gas compressor flows from the cylinder compression chambers 16 through the discharge passages 71b of the rear side block 7 and the second discharge passages 41b before it is released into the inner space 50 of the cylindrical body 40 from the releasing holes 41c. The compressed gas released into the inner space 50 through the releasing holes 41c moves inside the inner space 50 toward the filter 330 at the rear while being dissipated in the inner space 50 before it strikes the filter 330. In this dissipation process, the flow velocity of the compressed gas is considerably reduced as compared with that at the time of releasing, so that the oil, which has a relatively large specific gravity, is separated from the refrigerant gas and is gradually accumulated in the inner space 50. As for the compressed gas striking the filter 330, the oil particles contained therein are caught by the wires of the filter 330, whereas the gas component passes between the wires of the filter 330, whereby the oil and gas are separated from each other. The oil separated by the filter 330 drips therefrom to gather in the oil sump 18. Meanwhile, the gas component passes through the filter 330 to move to the discharge-port-side space 8b of the discharge chamber 8 before it is discharged through the discharge port 3.

Since the cylindrical body 40 is smaller than the discharge chamber 8, the diameter of the filter 330 mounted to the cylindrical body 40 can be smaller than that in the case in which the filter 330 is directly mounted in the discharge chamber 8, so that the filter 330 is less subject to deformation when the compressed gas strikes the same.

While in the above embodiment the cylindrical body has the cylindrical body over the entire periphery, it is also possible to utilize a part of the housing as the cylindrical body.

Embodiment 6

Figure 7:
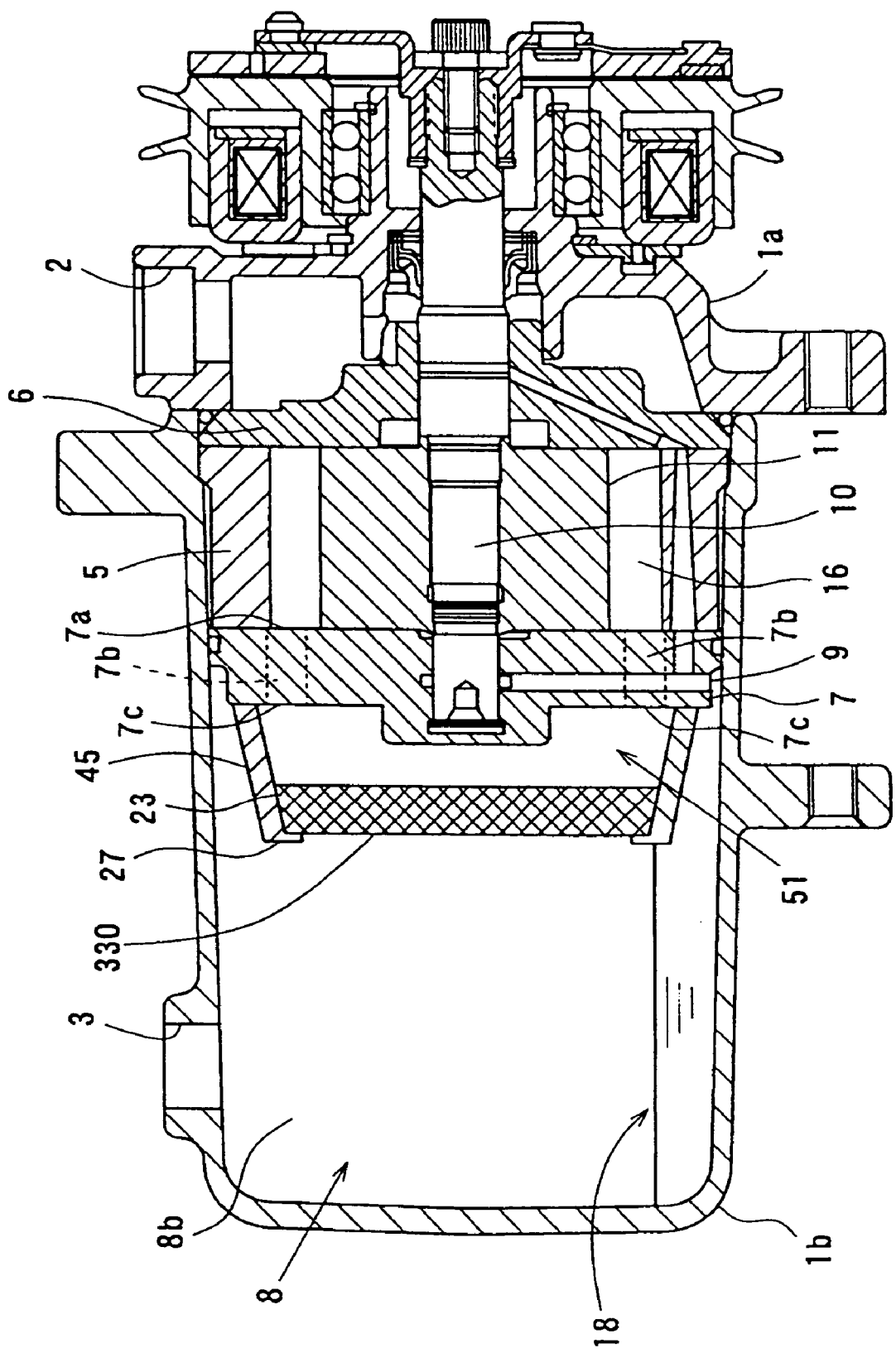
FIG. 7 is a general front sectional view of a gas compressor according to a sixth embodiment of the present invention with a modified cylindrical body configuration.

FIG. 7 shows a gas compressor according to a sixth embodiment, which is a modification of the fifth embodiment. In the sixth embodiment, a tapered cylindrical body 45 whose diameter is gradually diminished toward the forward end is mounted to the rear side block 7. At the opening at the forward end of the cylindrical body 45, a filter 330 is arranged in an installation portion 23 provided on the inner peripheral surface of the cylindrical body 45 in a manner similar to those in the above-mentioned embodiments. Formed at the forward edge of the cylindrical body situated on the discharge-port-side space 8b of the filter 330 is an annular retaining portion 27 for preventing displacement of the filter 330. The rear side block 7 has discharge passages 7b extending in the axial direction of the compressor, and releasing holes 7c constituting the compressed gas releasing portions are formed at the forward ends of the discharge passages 7b. Further, the rear side block has an oil intake hole 9, which is situated outside the cylindrical body 45.

As in the fifth embodiment, in the sixth embodiment also, the compressed gas is released from the releasing holes 7c into an inner space 51 constituting the releasing-portion-side space. When the compressed gas strikes the filter 330, the oil contained therein is separated, and the gas component passes between the wires of the filter 330 to reach the discharge chamber 8. The oil separated by the filter 330 drips therefrom and gathers in the oil sump 18. In this embodiment also, the filter 330, which has a relatively small diameter, is less subject to deformation when the compressed gas strikes the same. Further, in the sixth embodiment, due to the tapered configuration of the cylindrical body 45, the height of the opening of the cylindrical body 45 (the position where the filter 330 is installed) can be increased with respect to the oil sump 18, whereby it is possible to prevent as much as possible intrusion of oil in the oil sump 18 into the inner space 51 of the cylindrical body 45.

Further, in the sixth embodiment, the discharge passages 7b extend in the axial direction of the compressor, and the inner wall of the cylindrical body 45 is situated in front of the passages, so that part of the compressed gas released from the releasing holes 7c first strikes the inner wall of the cylindrical body 45, and then changes direction to strike the filter 330. Thus, prior to striking the filter 330, the compressed gas is dissipated over a wider range, thereby preventing the striking of the compressed gas from being concentrated on a part of the filter.

Embodiment 7

Figure 8:
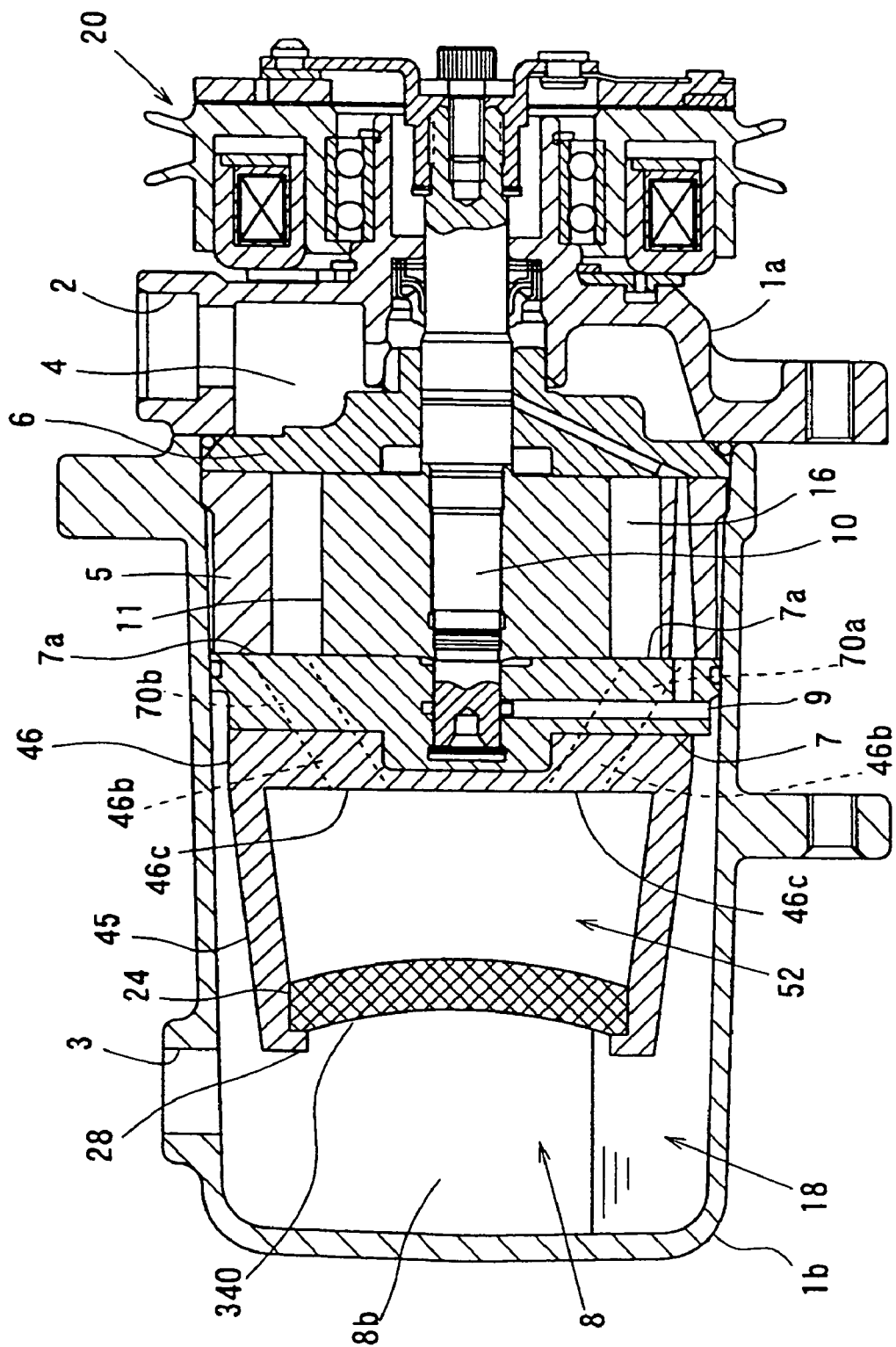
FIG. 8 is a general front sectional view of a gas compressor according to a seventh embodiment of the present invention in which the compressed gas discharging direction is adjusted.

FIG. 8 shows a gas compressor according to a seventh embodiment, which is a modification of the fifth and sixth embodiments.

In the gas compressor of the seventh embodiment, the tapered cylindrical body 45 whose diameter is gradually diminished toward the discharge chamber 8 side is mounted to the rear side block 7 through the intermediation of a base portion 46, and an inner space 52 constituting the releasing-portion-side space is formed in the cylindrical body 45.

The rear side block 7 has two discharge passages 70b inclined with respect to the axial direction of the compressor, and second discharge passages 46b communicating with the discharge passages 70b are formed in the base portion 46, releasing holes 46c which constitute the compressed gas releasing portions being formed at the forward ends of the second discharge passages 46b. Further, the rear side block 7 has the oil intake hole 9 which is situated outside the cylindrical body 45.

In the seventh embodiment, a filter 340 is mounted to an installation portion 24 provided in the inner periphery of the opening at the forward end of the cylindrical body 45, and the filter 340 is formed as a dome-shaped disc whose front and back sides are convex on the releasing holes 46c side. This disc-shaped filter 340 is formed by using long SUS fibers having a thickness of 0.15 to 0.30 mm, in a density of 1.0 to 3.0 g/cm$^3$ and in a porosity of 60 to 95%, and has a diameter of 40 to 150 mm and a thickness of 8 to 30 mm. Further, in the filter 340, the ratio of the height of the convex portion thereof to the filter diameter is 0.05 to 0.2, and the apex of the convex portion is situated at the center of the filter 340.

At the forward end edge of the cylindrical body on the discharge chamber 8 side of the filter 340, there is formed an annular retaining portion 28 for preventing displacement of the filter 340.

As in the case of the gas compressors of the fifth and sixth embodiments, in the gas compressor of the seventh embodiment, the compressed gas is released from the releasing holes 46c into the inner space 52 of the cylindrical body 45, and is separated into oil and refrigerant gas without oil by the filter 340.

In the seventh embodiment also, the filter 340 with a small diameter is not easily deformed when the compressed gas strikes the same. Further, the front and back sides of the filter 340 are convex on the compressed gas inflow side, whereby the filter is still less subject to deformation by the striking load of the compressed gas by the convex portion. Further, since the load applied to the filter 340 is transmitted to the outer peripheral portion, the force with which the filter is held in close contact with the inner wall of the cylindrical body 45 increases, whereby, as in Embodiment 1, the retaining capacity for the filter 340 itself is enhanced.

Further, in the seventh embodiment, the extending directions of the discharge passages 46b are determined such that the compressed gas from the releasing holes 46c heads for the central portion, i.e., the apex, of the filter 340. Since the compressed gas released from the releasing holes 46c strikes the apex of the convex portion and its periphery, the strength enhancing effect due to the convex configuration can be effectively obtained.

Embodiment 8

Figure 9:
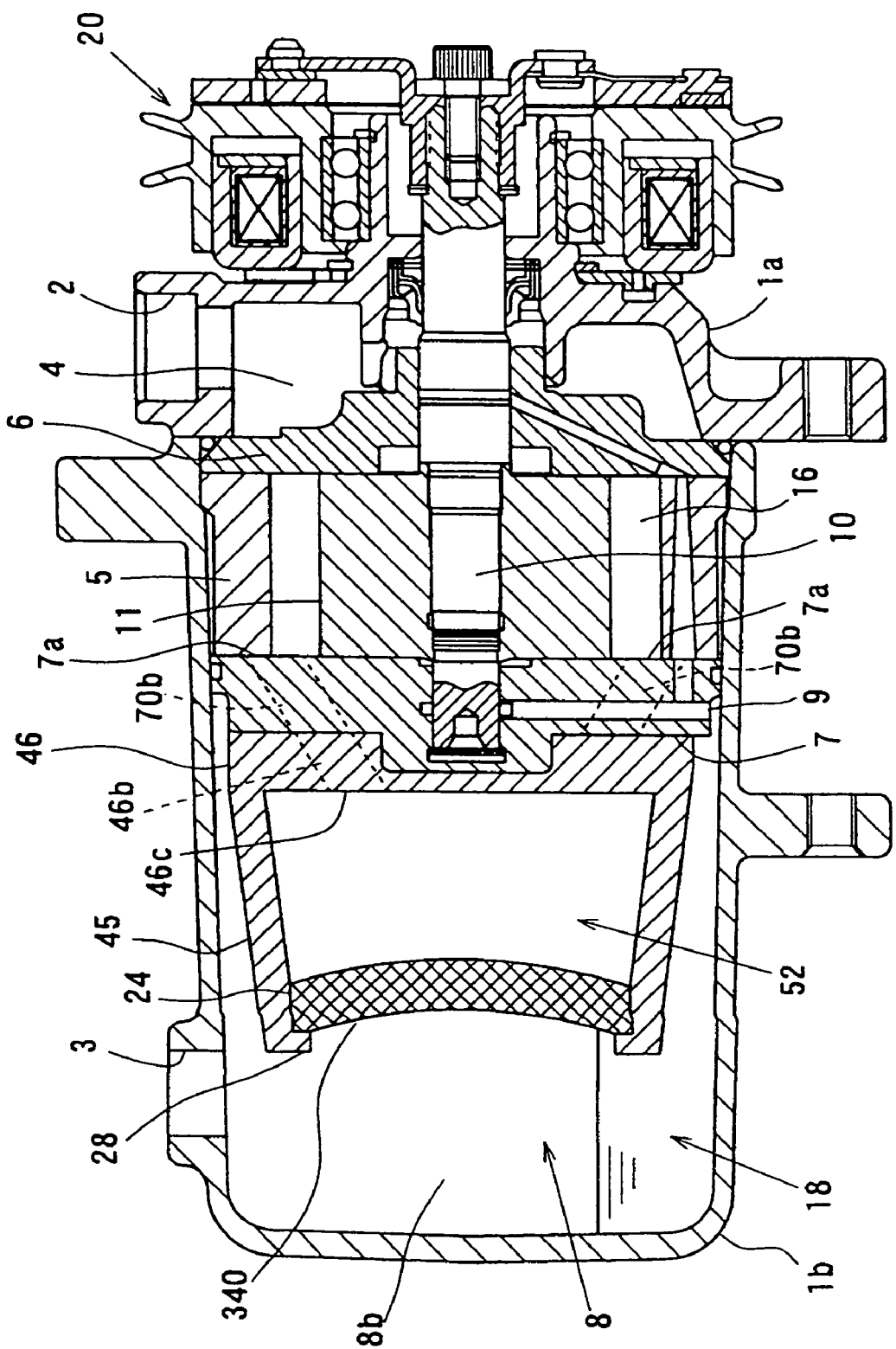
FIG. 9 is a general front sectional view of a gas compressor according to an eighth embodiment of the present invention having a plurality of compressed gas releasing portions.

FIG. 9 shows a gas compressor according to an eighth embodiment, which is a modification of the seventh embodiment.

In FIG. 9, the two discharge passages 7b formed in the rear side block 7 join together in the base portion 46 of the cylindrical body 45 to communicate with a second discharge passage 46b formed in a base portion 46, and a releasing hole 46c constituting the compressed gas releasing portion is formed at the forward end of the discharge passage 46b. As in the gas compressor of the seventh embodiment, in the gas compressor of the eighth embodiment, the compressed gas is released from the releasing hole 46c into the inner space 52 of the cylindrical body 45, and is separated into oil and refrigerant gas without oil by the filter 340.

In this way, the two discharge passages communicating with the gas compressing portion may be joined into one in the base portion of the cylindrical body.

Of the above-mentioned embodiments, each of the filters 300, 310, 320, and 340 is configured such that the outer peripheral portion of the filter is expanded peripherally upon its deformation caused when a force (dynamic pressure) of a jet stream due to a flow of the compressed gas released from the compressed gas releasing portion and a force (static pressure) due to a difference in pressure between front and rear sides of the filter which is generated by a flow path resistance in the filter are applied thereto, thereby increasing a force with which the filter is held in close contact with the installation portion. FIGS. 10A to 10G show modification examples of filters having the same function as those filters.

Figure 10:
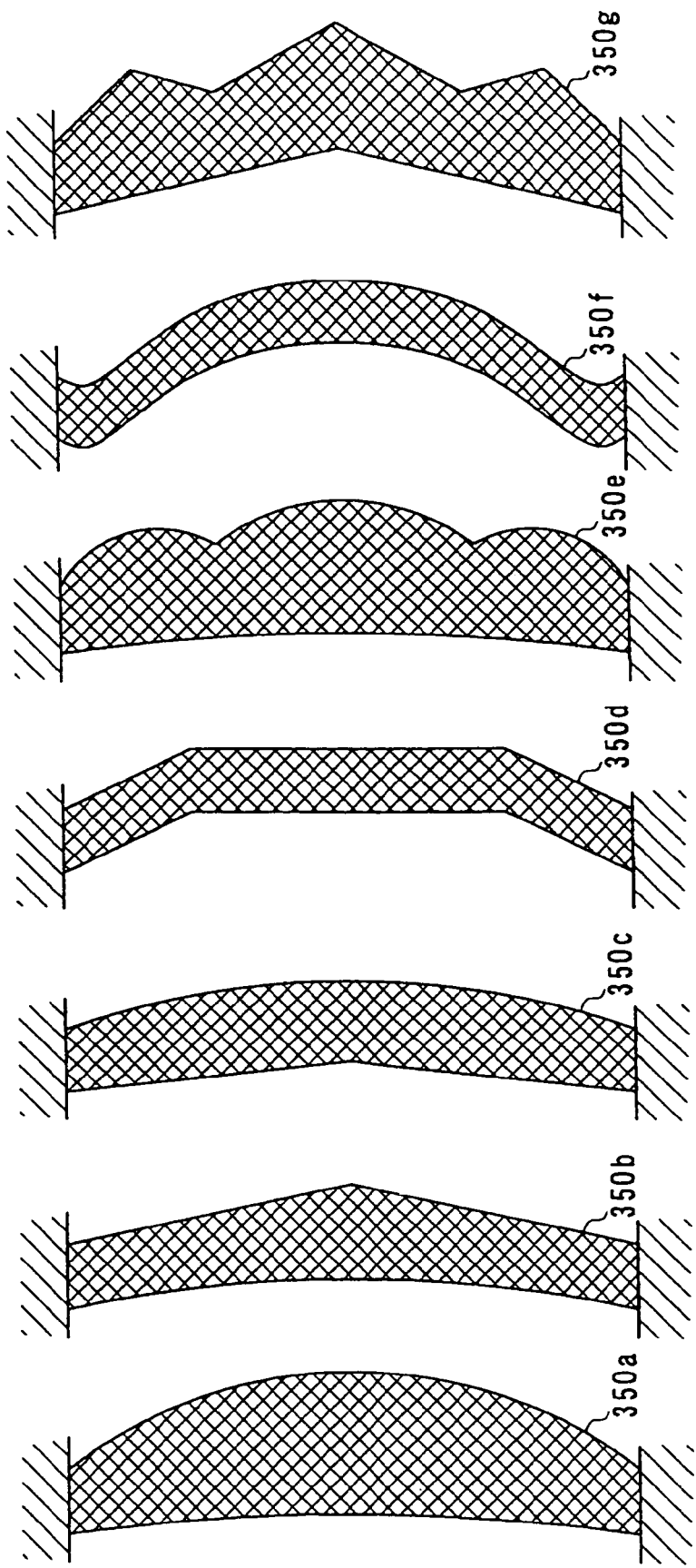
FIGS. 10A to 10G are a sectional view showing examples of modified filter configurations of the present invention.

In the filter 350a shown in FIG. 10A, its front side facing the compressed gas releasing portion and its back side in the rear thereof are both formed as curved surfaces having different curvatures. In the figure, the curvature of the front side is larger than that of the back side.

In the filter 350b shown in FIG. 10B, its front side facing the compressed gas releasing portion is formed as a conical or prismoidal side surface and its back side in the rear thereof is formed as a curved surface.

In the filter 350c shown in FIG. 10C, its front side facing the compressed gas releasing portion is formed as a curved surface and its back side in the rear thereof is formed as a conical or prismoidal side surface.

In the filter 350d shown in FIG. 10D, its front side facing the compressed gas releasing portion and its back side in the rear thereof are both formed to have conical or prismoidal configurations which are convex on the side of the compressed gas releasing portion.

In the filter 350e shown in FIG. 10E, its front side facing the compressed gas releasing portion is formed as a combination of plural curved surfaces and its back side in the rear thereof is formed as one curved surface.

In the filter 350f shown in FIG. 10F, its front side facing the compressed gas releasing portion and its back side in the rear thereof are both formed as curved surfaces, and an annular bend-back portion for bending the filter back toward the compressed gas releasing portion is formed on the outer periphery side thereof.

In the filter 350g shown in FIG. 10G, its front side facing the compressed gas releasing portion is formed by a combination of plural conical or prismoidal side surfaces and its back side in the rear thereof is formed as a conical or prismoidal side surface.

EXAMPLES

Next, examples of the present invention will be described in comparison with comparative examples.

Figure 13:
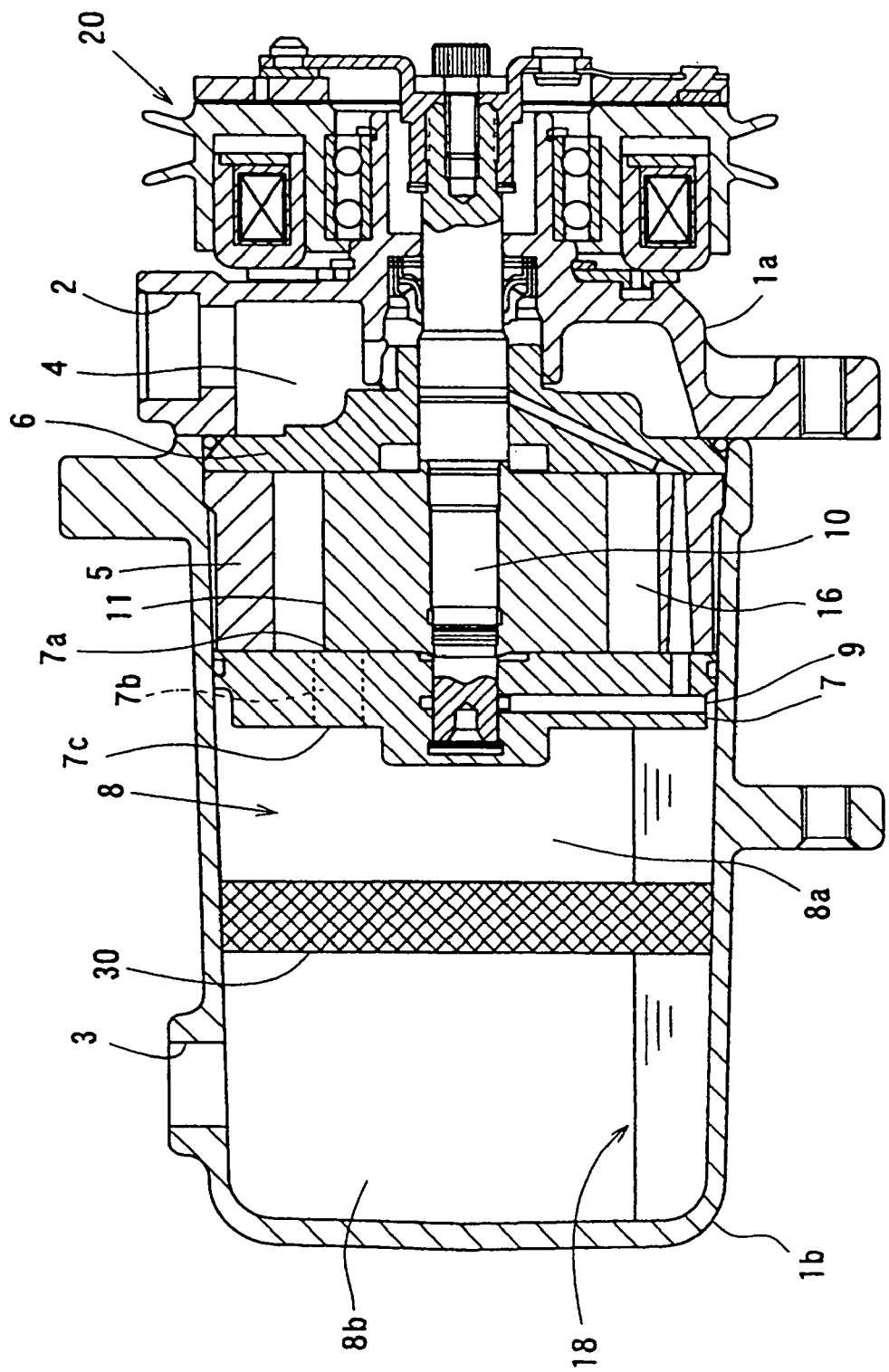
FIG. 13 is a general front sectional view of a conventional gas compressor.

To compare the strengths of different filters, the following examples were prepared: a gas compressor (discharge chamber dome type) in which a dome-shaped filter is arranged in the discharge chamber as in the embodiment of FIG. 1, a gas compressor (cylindrical body flat plate type) in which a flat filter is arranged at the forward end of a cylindrical body as shown in FIG. 6, and a gas compressor (cylindrical body dome type) in which a dome-shaped filter is arranged at the forward end of a cylindrical body as shown in FIG. 8. Further, as a comparative example, there was prepared a gas compressor (discharge chamber flat plate type) in which a flat filter is arranged in the discharge chamber as shown in FIG. 13. The gas compressors only differ in the way the filter is arranged. Otherwise, they have the same construction and the same discharge chamber volume.

In performing a strength test on the filters, evaluation was made by a liquid compression endurance test in which a large load was instantaneously applied to these filters. In the liquid compression endurance test, the following process is repeatedly conducted: oil in the oil sump is temporarily caused to flow reversely to the suction chamber side through a gap portion in the compressor main body by utilizing the difference between the high pressure in the discharge chamber and the low pressure in the suction chamber immediately after stopping the compressor, and, at the next operation start of the compressor, the oil accumulated on the suction chamber side is taken in and discharged. The oil intake/discharge amount at one starting is several hundred cm³.

In this liquid compression endurance test, an oil whose viscosity is rather low for a vane rotary type compressor was used in order to shorten the test time. The kinematic viscosity of the oil used is 80 mm²/s at 40° C. and 15 mm²/s at 100° C. When the viscosity of the oil is high, it takes long for the oil to pass through the gap portion of the compressor main body when the compressor is at rest, resulting in a long test period. In view of this, a low viscosity oil was used for the evaluation test.

The evaluation in the liquid compression endurance test was made as follows. The above-described process was repeated approximately 50,000 times to check whether there is any damage to each component. In the case of the discharge chamber flat plate type gas compressor of Comparative Example, the portion where the striking of the oil discharged from the compressor main body was concentrated underwent local deformation such that it projected to the opposite side.

In contrast, in the discharge chamber dome type filter, the cylindrical body flat plate type filter, and the cylindrical body dome type filter of Examples, practically no deformation was to be observed even after repeating the process 50,000 times, which proved their superiority in strength.

Next, for comparison in oil separation performance, there were prepared a discharge chamber dome type gas compressor as described above, a cylindrical body flat plate type gas compressor, and a conventional gas compressor as shown in FIG. 13 with the demister 30 removed. These gas compressors only differ in the way the filter is arranged and in the presence/absence of an oil separation block, and have substantially the same construction and the same discharge chamber volume.

In these gas compressors, OCR (oil circulation ratio) and oil retaining amount were measured with the compressor revolving speed varied. The OCR indicates the amount of oil (the mass ratio with respect to the compressed gas) discharged to the exterior from the gas compressor together with the compressed gas. The oil retaining amount indicates the amount of oil retained in the compressor, and is calculated from the oil level and the housing configuration; it is one of the indexes indicating oil separation efficiency.

Tables 2 and 3 and FIGS. 11 and 12 show the test results. Here, it is to be noted that the smaller the OCR value, the less the amount of oil flowing out to the air conditioning system and the less the amount of heat exchange by oil in the heat exchanger or the like, resulting in an improvement in air conditioning efficiency; the larger the oil retaining amount in the compressor, the less the danger of insufficient lubrication.

As is apparent from the tables and the drawings, as compared with the conventional compressor, the gas compressors of the present invention (dome type and cylindrical type) exhibit more satisfactory values in both OCR and oil retaining amount at any revolving rate, which proves the superiority of the present invention in separating oil effectively from the compressed gas.

TABLE 2

| OCR | Conventional type | Dome type | Cylindrical type |
|---|---|---|---|
| 2400 rpm | 2.1 | 0.6 | 0.6 |
| 3300 rpm | 2.7 | 1.3 | 1.4 |
| 4200 rpm | 4.4 | 2.2 | 1.3 |

Unit: mass %

TABLE 3

| In-case oil retaining amount | Conventional type | Dome type | Cylindrical type |
|---|---|---|---|
| 2400 rpm | 246 | 323 | 348 |
| 3300 rpm | 139 | 207 | 145 |
| 4200 rpm | 51 | 161 | 135 |

Unit: ml

As described above, the gas compressor of the present invention includes: a suction port for taking in a gas from outside; a suction chamber communicating with the suction port; a gas compressing portion communicating with the suction chamber; a compressed gas releasing portion provided in the gas compressing portion; a discharge chamber communicating with the compressed gas releasing portion; a discharge port communicating with the discharge chamber and adapted to discharge a compressed gas to outside; and a filter arranged in the discharge chamber so as to extend in a direction crossing the direction in which the compressed gas is released from the compressed gas releasing portion and dividing the discharge chamber space into a compressed-gas-releasing-portion-side space and a discharge-port-side space, in which both the front and back sides of the filter are convex on the compressed gas inflow side, whereby deformation caused by the striking of the compressed gas is restrained, and the load due to the striking is transmitted to the outer peripheral portion of the filter to thereby improve the filter retaining strength. Further, in the filter, oil contained in the compressed gas is more effectively separated, and thus the reduction in efficiency of the air conditioner and the like due to the oil flow to the air conditioning system and the like can be prevented. Furthermore, since a sufficient amount of oil can be retained in the gas compressor, it is possible to prevent oil shortage due to oil reduction.

According to another aspect of the invention, the gas compressor includes: a suction port for taking in a gas from outside; a suction chamber communicating with the suction port; a gas compressing portion communicating with the suction chamber; a compressed gas releasing portion provided in the gas compressing portion; a discharge chamber communicating with the compressed gas releasing portion; a discharge port communicating with the discharge chamber and adapted to discharge a compressed gas to outside; a cylindrical body extending in the discharge chamber so as to surround the compressed gas releasing portion to define an inner space in the discharge chamber; and a filter arranged so as to cover a cylinder hole of the cylindrical body, whereby the surface area of the filter can be diminished, thereby achieving an improvement in strength and restraining deformation due to the striking of the compressed gas. Further, as in the aspect of the invention described above, oil can be effectively separated from the compressed gas.

What is claimed is:

1. A gas compressor comprising:
a suction port for intaking a gas;
a suction chamber communicating with the suction port;
a gas compressing portion communicating with the suction chamber;
a compressed gas releasing portion provided in the gas compressing portion;
a discharge chamber communicating with the compressed gas releasing portion;
a discharge port communicating with the discharge chamber for discharging a compressed gas from the discharge chamber; and
a filter arranged in the discharge chamber so as to extend in a direction crossing the direction in which the compressed gas is released from the compressed gas releasing portion and dividing a discharge chamber space into a compressed gas releasing portion side space and a discharge port side space, wherein both front and back sides of the filter are convex on the compressed gas inflow side.

2. A gas compressor according to claim 1, wherein an apex of the convex portion of the filter is situated at a position where the compressed gas released from the compressed gas releasing portion strikes.

3. A gas compressor according to claim 1, wherein the gas compressing portion is equipped with a cylinder, side blocks situated at axial ends of the cylinder, a rotor rotatably arranged in the cylinder, and vanes provided in the rotor so as to be radially retractable, and wherein the oil used in the gas compressing portion exhibits a kinematic viscosity in a range of 60 to 350 $mm^2/s$ at 40° C. and 13 to 25 $mm^2/s$ at 100° C.

* * * * *